A. WERNER.
CLAMPING DEVICE FOR OVERHEAD TRANSPORTERS.
APPLICATION FILED AUG. 7, 1914.
1,160,799.
Patented Nov. 16, 1915.
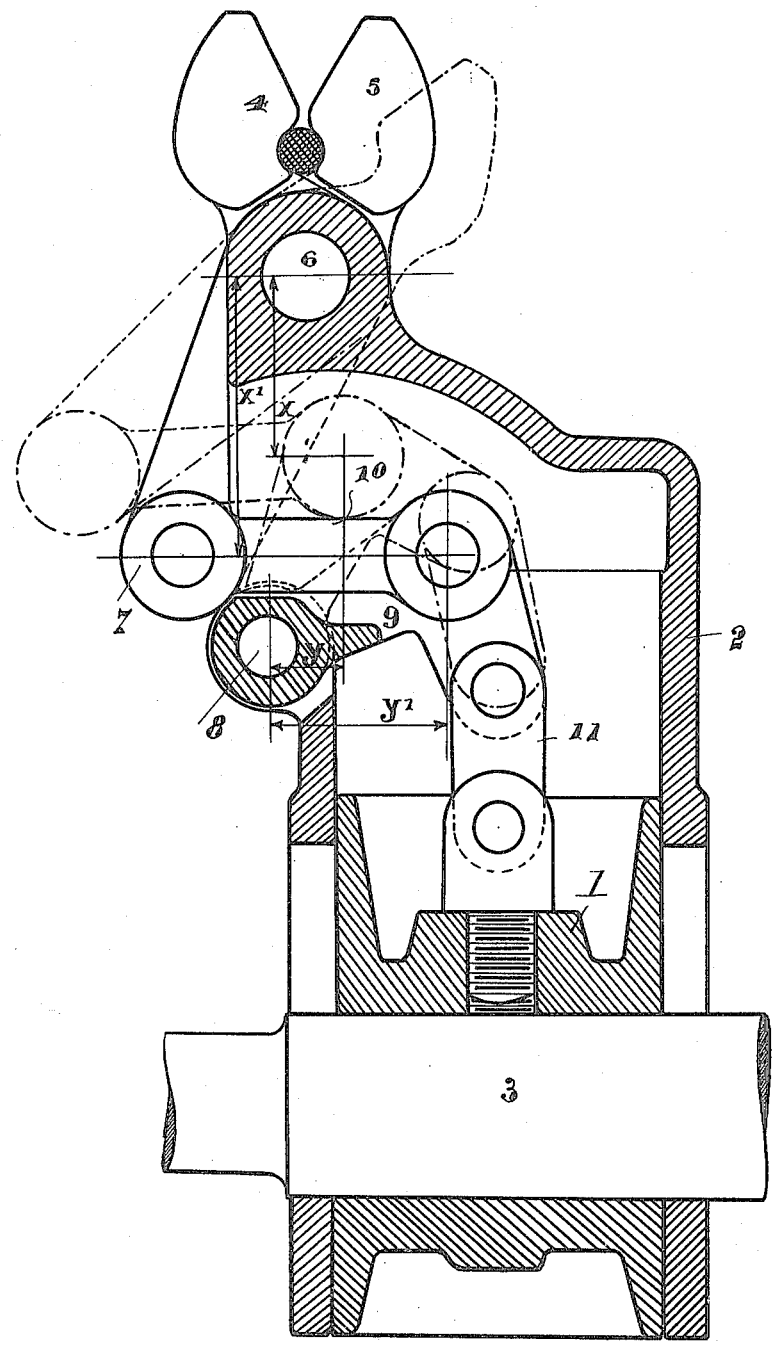
WITNESSES
INVENTOR
ALEXANDER WERNER
BY
ATTORNEY

UNITED STATES PATENT OFFICE.

ALEXANDER WERNER, OF COLOGNE, GERMANY.

CLAMPING DEVICE FOR OVERHEAD TRANSPORTERS.

1,160,799.     Specification of Letters Patent.     Patented Nov. 16, 1915.

Application filed August 7, 1914. Serial No. 855,711.

*To all whom it may concern:*

Be it known that I, ALEXANDER WERNER, engineer, subject of the Emperor of Austria-Hungary, residing at 18 Richard-Wagner strasse, in the city of Cologne, Germany, have invented new and useful Improvements in and Relating to Clamping Devices for Overhead Transporters; and I do hereby declare the following to be a full, clear, and exact description of the same.

This invention relates to a clamping gripper or pincers controlled by the action of the weight of the load, for cable transporters, comprising a movable jaw formed into a double lever, and a sliding part with which engages the device for suspending the charge.

Mechanisms of various kinds have been already suggested for transmitting the movement of the sliding part to the movable jaw in the devices of the kind in which the cable pincers are controlled by the weight of the charge and in which the load suspension device engages with the sliding part. The well known arrangements are not however free from defects, as the requirements to be fulfilled by the mechanism, are of several kinds, and up to now they have not been complied with in every respect. The mechanism must namely: (1) allow of a sufficiently high rate of transmission with the minimum of space occupied, (2) produce only a minimum of friction losses, that is to say, avoid, before everything sliding friction, (3) the mechanism must not move the jaws at the same speed during the whole closing operation, on the contrary the movement must take place quickly during the first portion, that is to say, as long as no pressure of the cable is exercised, and must take place slowly during the second portion, that is to say, when pressure is exercised on the cable. The mechanism forming the subject of this invention satisfies all these requirements owing to the fact that, according to the invention, a bell crank lever is pivoted with the extremity of one of its branches to the rolling truck, whereas the movable jaw is in connection with the angular point of the bell crank lever, and the sliding part in connection with the end of the other branch of the said bell crank lever, by means of return-arms. In that way, during the closing movement, the leverage of the force applied to the jaw, and the leverage of the force applied to the bell crank lever, continuously increase until the closing position is reached. The mechanism occupies therefore very little space and there is only rotary friction.

The accompanying drawing shows diagrammatically a construction according to this invention. In this drawing, 1 is the sliding part or bearing, which can be raised and lowered in the frame 2 of the rolling mechanism and in which is secured the bolt 3 for the suspension of the load. Against the frame of the rolling mechanism 2 is arranged the fixed clamping jaw 4 and the movable clamping jaw 5 pivoted about a pin 6 and provided with an extension 7 projecting beyond the center of rotation. Moreover, the bell crank lever 9 is pivoted at the point 8 to the frame 2 of the rolling mechanism; the arm 7 is connected to the said bell crank lever by a return arm 10, and the sliding bearing 1 by a return arm 11.

It clearly follows from the drawing which shows the closed position of the pincers and also in dotted lines, the open position of the clamping pincers, that the leverage of the force applied at 7, increases from the length $x$ to the length $x'$, and that the leverage acting on the bell crank lever 9, increases from the size $y$ to the size $y'$.

Having fully described my invention, what I claim and desire to secure by Letters Patent is:

1. In a clamping device for overhead transporters, the combination of a rolling truck with frame, a sliding part adapted to be raised and lowered in said frame, a bolt secured to said sliding part and intended for suspending the load, a stationary clamping jaw fixed to the frame and a movable clamping jaw provided with an extension, a bolt in the top part of the frame, about which bolt the movable clamping jaw can pivot, the said extension being of such dimension as to project beyond the center of rotation, substantially as described.

2. In a clamping device for overhead transporters, the combination of a rolling truck with frame, a sliding part in said frame, a bolt secured to said sliding part, a stationary clamping jaw and a movable clamping jaw, the latter being provided with an extension projecting beyond the center of rotation formed by a bolt arranged in the top part of the frame and about which the movable clamping jaw can pivot, a bell crank lever having the extremity of one of its branches pivotally arranged in the frame of the rolling truck, a return arm connecting the summit of said bell crank lever with the extension of the movable jaw and a second return arm connecting the extremity of the other branch of said bell crank lever with the sliding part, the movable jaw being thereby formed into a double lever, substantially as described.

In testimony whereof, I have signed my name to this specification in the presence of two subscribing witnesses.

ALEXANDER WERNER.

Witnesses:
 ALBERT PIETRKOWSKI,
 PHILIPP LÖWENTHAL.